(12) United States Patent
Yano et al.

(10) Patent No.: US 10,455,144 B2
(45) Date of Patent: Oct. 22, 2019

(54) INFORMATION PROCESSING APPARATUS, INFORMATION PROCESSING METHOD, SYSTEM, AND NON-TRANSITORY COMPUTER-READABLE STORAGE MEDIUM

(71) Applicant: CANON KABUSHIKI KAISHA, Tokyo (JP)

(72) Inventors: Kotaro Yano, Tokyo (JP); Tomoaki Kawai, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/845,329

(22) Filed: Dec. 18, 2017

(65) Prior Publication Data
US 2018/0205877 A1    Jul. 19, 2018

(30) Foreign Application Priority Data
Jan. 13, 2017   (JP) ................. 2017-004616

(51) Int. Cl.
| H04N 5/232 | (2006.01) |
| G06K 9/62 | (2006.01) |
| G06K 9/46 | (2006.01) |
| G06N 3/04 | (2006.01) |
| G06K 9/00 | (2006.01) |

(52) U.S. Cl.
CPC ..... *H04N 5/23216* (2013.01); *G06K 9/00369* (2013.01); *G06K 9/4642* (2013.01); *G06K 9/6212* (2013.01); *G06N 3/0454* (2013.01); *G06N 3/0472* (2013.01); *H04N 5/23219* (2013.01); *H04N 5/23296* (2013.01); *H04N 5/23299* (2018.08)

(58) Field of Classification Search
CPC .......... H04N 5/23216; H04N 5/23219; H04N 5/23299; H04N 5/23296; G06K 9/6212; G06K 9/4642; G06K 9/00369; G06N 3/0454; G06N 3/0472
See application file for complete search history.

(56) References Cited

U.S. PATENT DOCUMENTS

| 7,355,627 B2 | 4/2008 | Yamazaki et al. |
| 2008/0055413 A1* | 3/2008 | Hayashi ................. H04N 5/232 348/169 |

(Continued)

FOREIGN PATENT DOCUMENTS

| JP | 2003219225 A | 7/2003 |
| JP | 2004056473 A | 2/2004 |

OTHER PUBLICATIONS

Dalal et al. "Histograms of Oriented Gradients for Human Detection." Proceedings of the IEEE Conference on Computer Vision and Pattern Recognition. 2005: 1-8.

*Primary Examiner* — Albert H Cutler
(74) *Attorney, Agent, or Firm* — Rossi, Kimms & McDowell LLP (57) ABSTRACT

A first control amount of an image capturing device is estimated based on a region of an object detected from a captured image by the image capturing device. A second control amount of the image capturing device instructed in accordance with a user operation is acquired. A parameter required for the estimating is updated based on a difference between the first control amount and the second control amount.

11 Claims, 5 Drawing Sheets

(56) References Cited

U.S. PATENT DOCUMENTS

| | | | |
|---|---|---|---|
| 2011/0090359 A1* | 4/2011 | Sagawa | G06K 9/3233 |
| | | | 348/222.1 |
| 2014/0232818 A1* | 8/2014 | Carr | H04N 5/222 |
| | | | 348/36 |
| 2016/0277673 A1* | 9/2016 | Carr | H04N 5/2228 |
| 2017/0163879 A1* | 6/2017 | Tsuji | H04N 5/23216 |
| 2018/0039856 A1* | 2/2018 | Hara | G06T 7/11 |

* cited by examiner

INFORMATION PROCESSING APPARATUS, INFORMATION PROCESSING METHOD, SYSTEM, AND NON-TRANSITORY COMPUTER-READABLE STORAGE MEDIUM

BACKGROUND OF THE INVENTION

Field of the Invention

The present invention relates to a control technique of an image capturing device.

Description of the Related Art

Conventionally, cameras capable of changing a capturing direction and a magnification by controlling, in accordance with a control signal, a pan/tilt mechanism and a zoom mechanism of a capturing lens have been developed. Such a camera is useful for an intended use of monitoring, and can track or zoom in on a suspicious person by changing a magnification or a capturing direction in a case where the suspicious person appears on a video image captured by the camera, for example.

However, a skilled operation is necessary for a surveillant to perform control of the camera while viewing the video image of the camera, and continuing this operation for a long time or performing this operation with respect to a large number of cameras is difficult. To handle such a problem, Japanese Patent Laid-Open No. 2003-219225 proposes a monitoring apparatus that automatically controls a camera in accordance with an electrically driven panhead and an electrically driven zoom lens, to detect and track a person. In contrast, Japanese Patent Laid-Open No. 2004-56473 proposes a monitoring control apparatus that learns, by a neural network, a relationship between an image pattern and camera control by an operator, and thereby automates capturing control.

However, in Japanese Patent Laid-Open No. 2003-219225, merely zooming in on and tracking a detected person is performed, and because tracking control is performed even for a person who is not a target, there is a possibility that a data loss may occur if an important event occurs during tracking.

In addition, in Japanese Patent Laid-Open No. 2004-56473, because the relationship between an image pattern and a tracking operation performed by an operator is simply learned irrespective of the existence or absence of a person in the video image, there is a possibility that incorrect capturing control will be performed if a person does not appear.

SUMMARY OF THE INVENTION

The present invention was conceived in view of these kinds of problems, and provides a technique for performing, with good precision, capturing control that takes an operator's intention into account.

According to the first aspect of the present invention, there is provided an information processing apparatus, comprising: an estimation unit configured to, based on a region of an object detected from a captured image by an image capturing device, estimate a first control amount of the image capturing device; an acquisition unit configured to acquire a second control amount of the image capturing device instructed in accordance with a user operation; and a learning unit configured to update a parameter required for the estimation, based on a difference between the first control amount and the second control amount.

According to the second aspect of the present invention, there is provided a system comprising an image capturing device and an information processing apparatus operable to control the image capturing device, wherein the information processing apparatus comprises: an estimation unit configured to, based on a region of an object detected from a captured image by the image capturing device, estimate a first control amount of the image capturing device; an acquisition unit configured to acquire a second control amount of the image capturing device instructed in accordance with a user operation; and a learning unit configured to update a parameter required for the estimation, based on a difference between the first control amount and the second control amount.

According to the third aspect of the present invention, there is provided an information processing method, comprising: estimating a first control amount of an image capturing device based on a region of an object detected from a captured image by the image capturing device; acquiring a second control amount of the image capturing device instructed in accordance with a user operation; and updating a parameter required for the estimating, based on a difference between the first control amount and the second control amount.

According to the fourth aspect of the present invention, there is provided a non-transitory computer-readable storage medium storing a computer program for causing a computer to function as an estimation unit configured to, based on a region of an object detected from a captured image by an image capturing device, estimate a first control amount of the image capturing device; an acquisition unit configured to acquire a second control amount of the image capturing device instructed in accordance with a user operation; and a learning unit configured to update a parameter required for the estimation, based on a difference between the first control amount and the second control amount.

Further features of the present invention will become apparent from the following description of exemplary embodiments (with reference to the attached drawings).

DESCRIPTION OF THE EMBODIMENTS

Below, explanation will be given for embodiments of present invention with reference to the accompanying drawings. Note that embodiments described below merely illustrate examples of specifically implementing the present invention, and are only specific embodiments of a configuration defined in the scope of the claims.

First Embodiment

Figure 1:
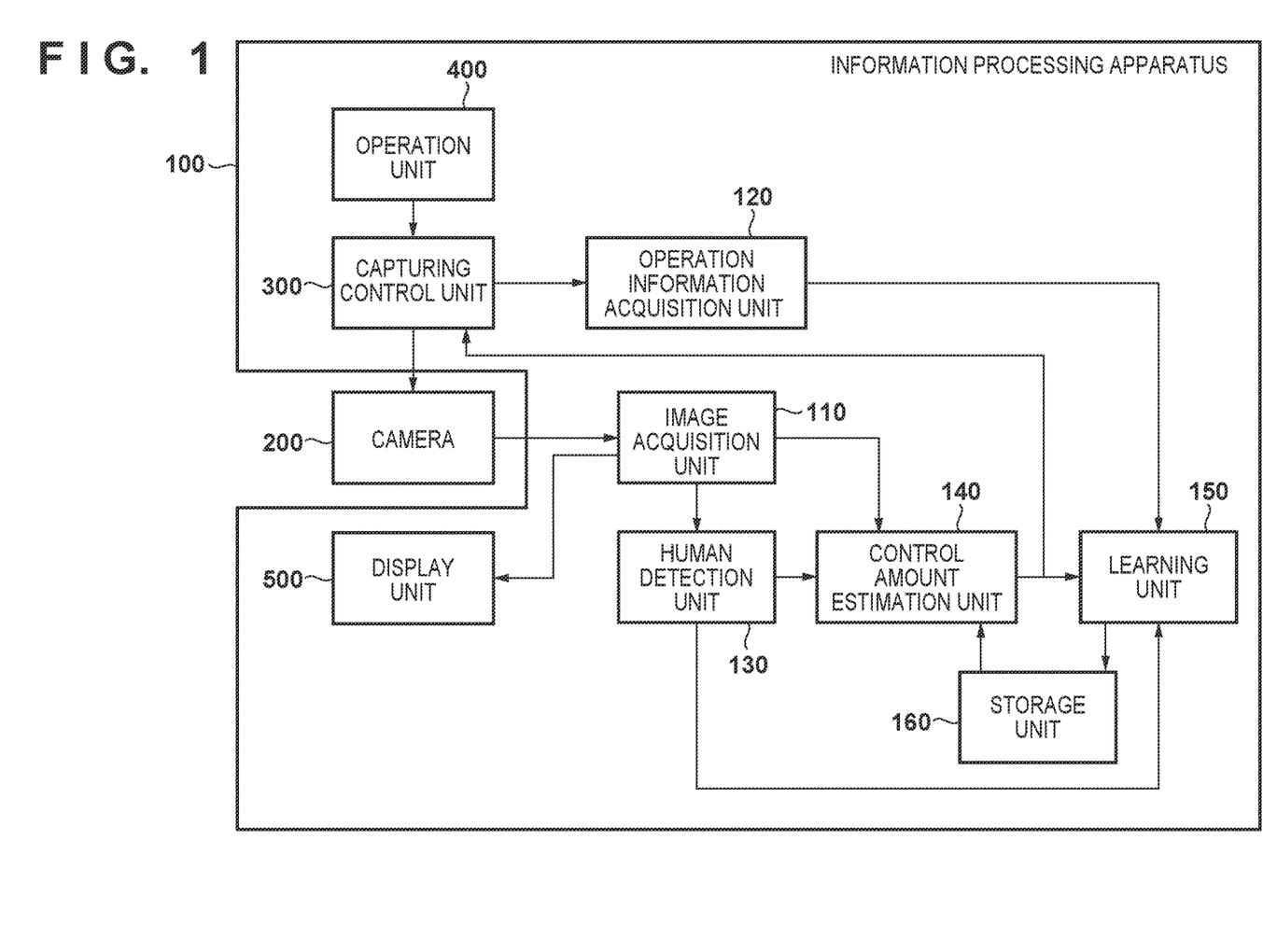
FIG. 1 is a block diagram for showing a configuration example of a system.

Firstly, a description will be given regarding an example configuration of a system according to present embodiment using the block diagram of FIG. 1. As illustrated in FIG. 1, a system according to the present embodiment has a camera 200 and an information processing apparatus 100 for performing operation control of the camera 200.

Firstly, explanation is given regarding the camera 200. The camera 200 has a zoom mechanism and a pan/tilt mechanism for a capturing lens, and panning, tilting, and zooming of the camera 200 can be controlled from the information processing apparatus 100. The camera 200 captures a moving image in accordance with control from the information processing apparatus 100. The camera 200 outputs to the information processing apparatus 100 an image (a captured image) of each frame that configures the captured moving image. The camera 200 may be a camera that captures still images.

Next, explanation is given regarding the information processing apparatus 100.

An operation unit 400 is configured by a user interface such as a mouse, a keyboard, or a touch panel screen, and a user can input various instructions to a capturing control unit 300 by operating the operation unit 400.

The capturing control unit 300 generates, in accordance with an operation instruction from the operation unit 400 or a "control amount for panning, tilting, zooming, or the like" estimated by a control amount estimation unit 140 in accordance with estimation processing that is described later, a control signal for controlling panning, tilting, zooming, or the like of the camera 200. Below, the "control amount for panning, tilting, zooming, or the like" of the camera 200 may be simply referred to as a control amount. The capturing control unit 300 outputs the generated control signal to the camera 200. The camera 200 controls panning, tilting, and zooming of the capturing lens in accordance with the control signal.

An operation information acquisition unit 120 acquires the control amount indicated by the control signal from the control signal generated by the capturing control unit 300. An image acquisition unit 110 acquires a captured image that is outputted from the camera 200.

A human detection unit 130 detects a region in which a person appears (a person region) from the captured image acquired by the image acquisition unit 110. A display unit 500 is configured by a CRT, a liquid crystal screen, or the like, and displays the captured image acquired by the image acquisition unit 110.

The control amount estimation unit 140 uses the captured image acquired by the image acquisition unit 110, a detection result from the captured image made by the human detection unit 130, and an estimation parameter stored in a storage unit 160 to, for each person region in the captured image, estimate a control amount and a value indicating a level of interest (an interest level) with respect to the person in the person region.

A learning unit 150 acquires an interest level for each person region in the captured image acquired by the image acquisition unit 110. The learning unit 150 acquires the interest level by estimating to what degree a user is paying attention to the person region, based on the position of the person region in the captured image acquired by the image acquisition unit 110, a user operation (zooming) with respect to the person in the person region, or the like. The learning unit 150 uses the acquired interest level, the control amount acquired by the operation information acquisition unit 120, and the control amount and interest level estimated by the control amount estimation unit 140 to update (learn) the estimation parameter stored in the storage unit 160.

Figure 2:
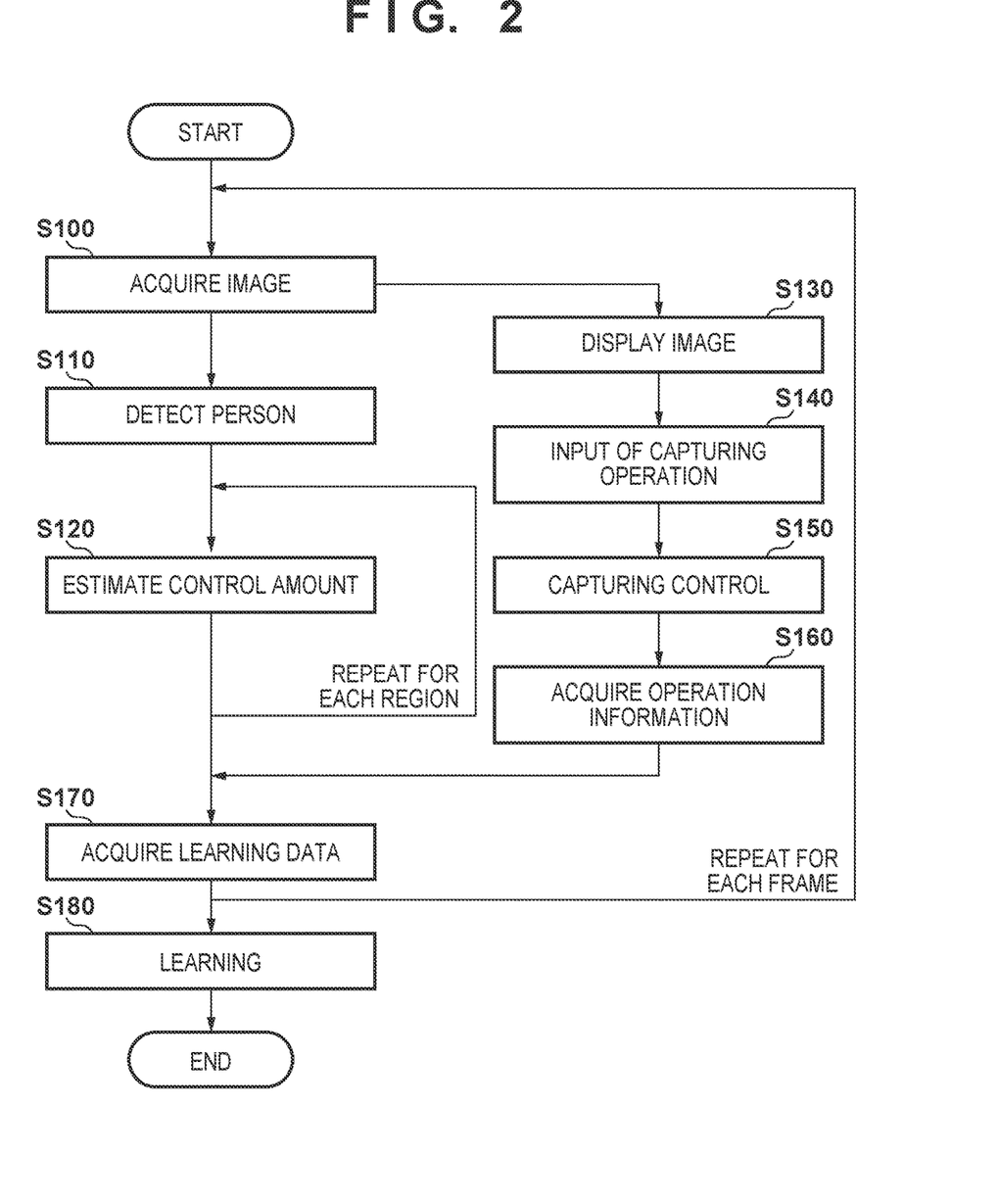
FIG. 2 is a flowchart of processing for learning an estimation parameter.

Processing for learning the estimation parameter which is performed by the information processing apparatus 100 is explained by using FIG. 2 which illustrates a flowchart for this processing.

In step S100, the image acquisition unit 110 acquires a captured image that is outputted from the camera 200. In the present embodiment, it is assumed that a captured image is color image data in which a luminance value of each color component of R (red), G (green), and B (blue) of each pixel is represented by 8 bits. However, a captured image is not limited to color image data and may be monochrome image data, and the number of bits or color component types of each pixel are not limited to specific types or a specific number of bits.

In step S110, the human detection unit 130 detects a person region from the captured image acquired in step S100. As a method for detecting a person from an image, there is the method recited in Dalal and Triggs. Histograms of Oriented Gradients for Human Detection. Proceedings of the IEEE Conference on Computer Vision and Pattern Recognition, 2005, for example. In the method recited in Dalal and Triggs. Histograms of Oriented Gradients for Human Detection. Proceedings of the IEEE Conference on Computer Vision and Pattern Recognition, 2005, an oriented gradient histogram feature (Histograms of Oriented Gradients) is extracted from an image, and whether there is a person is identified by using a model obtained by learning the extracted feature amount by using a support vector machine. Note that the method for detecting a person region from a captured image is not limited to the method disclosed in Dalal and Triggs. Histograms of Oriented Gradients for Human Detection. Proceedings of the IEEE Conference on Computer Vision and Pattern Recognition, 2005. For example, a feature amount to be extracted is not limited to an oriented gradient histogram feature, and a Haar-like feature, a LBPH feature (Local Binary Pattern Histogram), or the like may be used, or these may be combined. In addition, a model for identifying a person is not limited to the support vector machine, and an AdaBoost classifier, a random classification tree (Randomized Tree), or the like may be used. Note that, if a plurality of persons appear in a captured image, the human detection unit 130 detects each person.

Upon detecting a person region, the human detection unit 130 outputs image coordinates of the four corners of the person region, and a likelihood with respect to the person region. The likelihood with respect to a person region is a result of matching the feature amount extracted from the person region with the model for identifying a person, and represents a degree of matching with the model.

Figure 3:
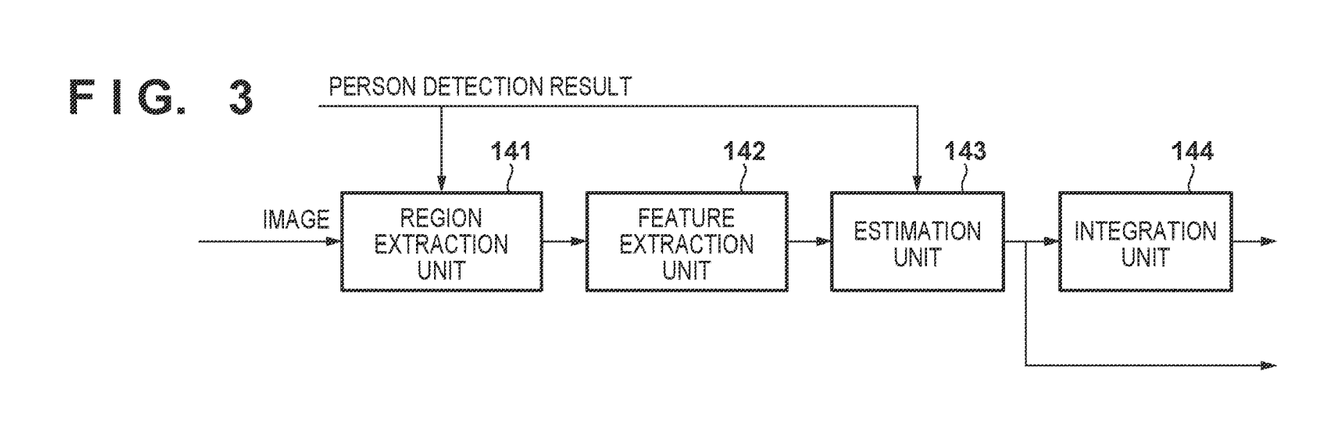
FIG. 3 is a block diagram that illustrates an example of a configuration of a control amount estimation unit 140.

In step S120, for a person region in the captured image acquired in step S100, the control amount estimation unit 140 estimates a control amount and a value (an interest level) that indicates a level of interest with respect to the person in the person region. The processing in step S120 is performed for each person region in the captured image acquired in step S100. When the processing of step S120 completes for each person region in the captured image acquired in step S100, the processing proceeds to step S170. Here, the block diagram of FIG. 3 is used to give an explanation regarding an example of a configuration of the control amount estimation unit 140.

A region extraction unit 141 extracts, from the captured image acquired in step S100, an image in the person region detected by the human detection unit 130 (the region defined by the image coordinates of the four corners detected by the human detection unit 130), and generates a normalized image resulting from normalizing the extracted image to a predetermined size.

Figure 4:
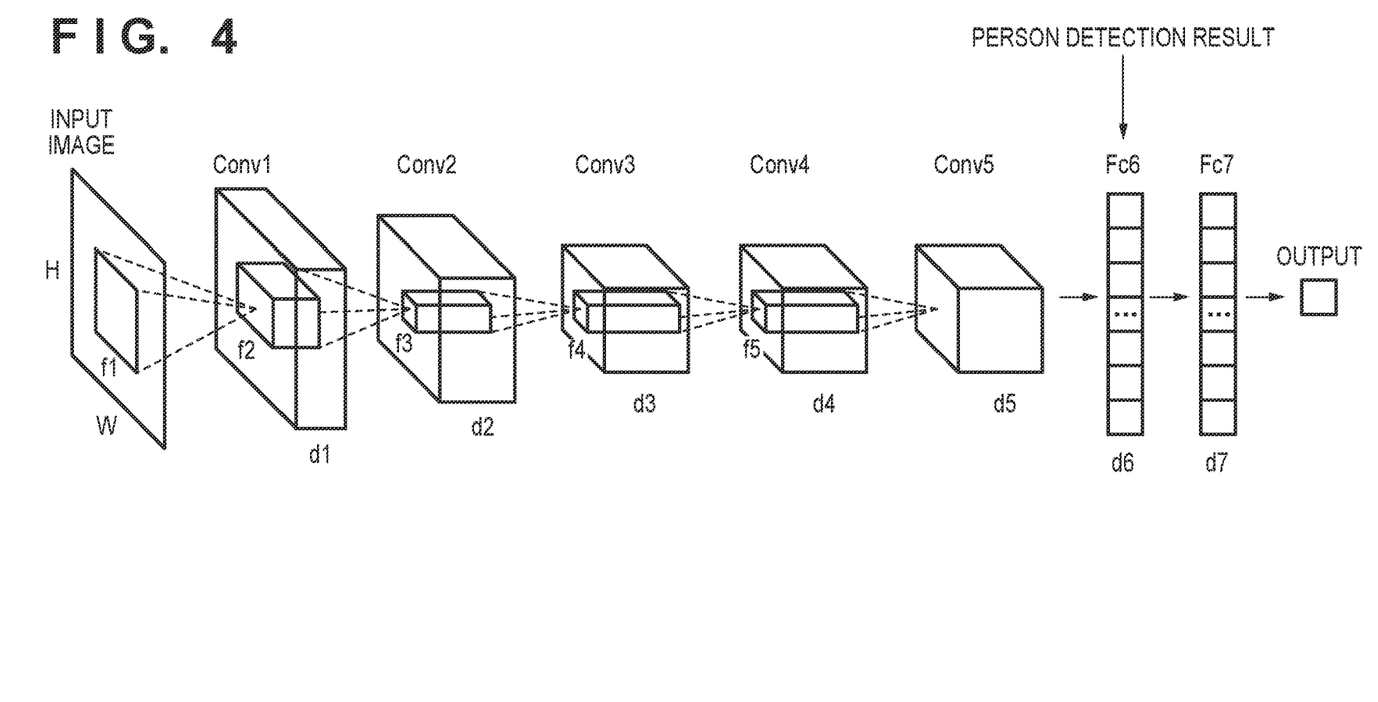
FIG. 4 is a view that illustrates an example of a configuration of a deep neural network.

A feature extraction unit 142 and an estimation unit 143 are configured by a deep neural network illustrated in FIG. 4. In the deep neural network illustrated in FIG. 4, calculations for a five-layer convolutional neural network are performed, taking an input image (the normalized image) having H vertical pixels×W horizontal pixels as an input, and a calculation result thereof is inputted to a fully-connected neural network of the sixth layer and the seventh layer to obtain an output. f1 through f5 respectively represent filter sizes of a convolution calculation of the first layer (Conv1) through the fifth layer (Conv5), and d1 through d7 respectively represent numbers of output channels for the first layer through the seventh layer (the sixth layer and the seventh layer are respectively Fc6 and Fc7).

The convolutional neural network of the first layer through the fifth layer is included in the feature extraction unit 142, and the feature extraction unit 142 extracts an image feature amount from the input image in accordance with the convolutional neural network of the first layer through the fifth layer. The feature extraction unit 142 then outputs the image feature amount extracted from the input image.

The fully-connected neural network of the sixth layer and the seventh layer is included in the estimation unit 143. The estimation unit 143 obtains, by the fully-connected neural network of the sixth layer and the seventh layer, the control amount and the interest level corresponding to the person region from the image feature amount of the person region outputted from the feature extraction unit 142 and the likelihood and the image coordinates of the four corners outputted from the human detection unit 130.

Returning to FIG. 3, the integration unit 144 does not operate when the information processing apparatus 100 is performing processing for learning the estimation parameter, and outputs output from the estimation unit 143 (the control amount and the interest level corresponding to the person region) to the learning unit 150 as is. Operation of the integration unit 144 when the information processing apparatus 100 is not performing processing for learning the estimation parameter is described later.

By performing the processing of step S120 using the configuration of FIG. 3 explained above on each person region in the captured image, it is possible to estimate the control amount and the interest level corresponding to each person region.

Meanwhile, the captured image acquired in step S100 is displayed on the display unit 500 in step S130. Here, when a user operates the operation unit 400 to input an instruction (an operation instruction) for operating panning, tilting, zooming, or the like of the camera 200, in step S140, the capturing control unit 300 acquires the operation instruction from the operation unit 400.

In step S150, the capturing control unit 300 generates, in accordance with the operation instruction acquired in step S140, a control signal for controlling panning, tilting, zooming, or the like of the camera 200, and outputs the generated control signal to the camera 200. By this, the camera 200 changes the panning, tilting, zooming, or the like in accordance with the control signal outputted from the capturing control unit 300.

In step S160, the operation information acquisition unit 120 acquires, from the control signal generated by the capturing control unit 300 in step S150, a control amount indicated by the control signal.

In step S170, the learning unit 150 acquires the control amount and the interest level estimated for each person region by the control amount estimation unit 140 in step S120, and the control amount acquired by the operation information acquisition unit 120 in step S160. The learning unit 150 also determines, from the detection result by the human detection unit 130 and the control amount acquired by the operation information acquisition unit 120, which person the user is giving interest to in the captured image, and acquires the interest level for each person region in the captured image. The interest level of a person (person region) that a user moved close to the center of the captured image or zoomed in on by operating the operation unit 400 is set to "1", and the interest level of other persons (person regions) is set to "0". In addition, in a case where no operation is performed, the interest level for all detected persons is set to "0".

In this way, the learning unit 150 acquires "the control amount and interest level for each person region that are estimated by the control amount estimation unit 140, the control amount acquired by the operation information acquisition unit 120, and the interest level for each person region acquired from the captured image by the learning unit 150" for the captured image of one frame as learning data.

When the learning unit 150 has been able to collect the learning data for a defined number of frames, the processing proceeds to step S180. Meanwhile, when the learning data has not been collected for the defined number of frames, the processing of step S100 onward is repeated for the next frame.

Note that a condition for proceeding to step S180 is not limited to a specific condition. For example, configuration may be taken so that the processing proceeds to step S180 when a data amount estimated by the control amount estimation unit 140 becomes a predetermined amount or more.

In step S180, the learning unit 150 uses the learning data to update (learn) the estimation parameter stored in the storage unit 160—in other words a coupling coefficient between neurons in the fully-connected neural network of the sixth layer and the seventh layer described above.

An explanation is given here regarding processing for updating the estimation parameter using the learning data. Let the control amount and the interest level collected from the defined number of frames of captured images by the control amount estimation unit 140 respectively be C={C1, C2, . . . , Cn} and a={a1, a2, . . . , an}. n is an integer greater than or equal to 2. More precise learning is possible as n increases, but time for learning is incurred proportionally. Here, Ci and ai ($1 \leq i \leq n$) are respectively the control amount and the interest level estimated by the control amount estimation unit 140 with respect to the same person region in a captured image of the same frame. Note that Ci=(Pi, Ti, Zi), where Pi represents a control amount for panning, Ti represents a control amount for tilting, and Zi represents a control amount for zooming. In addition, let the control amount acquired by the operation information acquisition unit 120 for the captured image where Ci is obtained be $\hat{C}i$. $\hat{C}i = (\hat{P}i, \hat{T}i, \hat{Z}i)$, where $\hat{P}i$ represents a control amount for panning, $\hat{T}i$ represents a control amount for tilting, and $\hat{Z}i$ represents a control amount for zooming. In addition, let the interest level acquired by the learning unit 150 for the person region where ai is obtained be $\hat{a}i$.

In the present embodiment, stochastic gradient descent for obtaining the estimation parameter from the gradient of average loss is used. In the present embodiment, differences in the control amounts and interest levels are evaluated as an average loss. A loss function (the evaluation value) is obtained by (Equation 1) indicated below.

$$L=\Sigma\{w1\times(Pi-P\hat{i})^2+w2\times(Ti-T\hat{i})^2+w3\times(Zi-Z\hat{i})^2+w4\times(ai-a\hat{i})^2\}$$ (Equation 1)

w1, w2, w3, and w4 are defined weighting coefficients. In addition Z represents a sum for all of i (=1 to n). Configuration may be taken to use all of the data used in learning, or randomly select a predetermined number of pieces of data.

The learning unit 150 learns the estimation parameter so that the average loss gets small by obtaining, based on (Equation 1), respective gradients from learning data obtained by causing the coupling coefficient (the estimation parameter) in the aforementioned sixth layer and seventh layer to change by just a minute amount. The learned estimation parameter is saved by overwriting the estimation parameter stored in the storage unit 160, and thereby the estimation parameter stored in the storage unit 160 is updated.

Various conditions can be considered for a condition for ending learning of the estimation parameter. In other words, learning may be ended when an amount of change of the value of the loss function becomes less than a predetermined value, or when a number of times of learning has reached a predetermined value. In addition, learning may be ended when a user has operated the operation unit 400 to input an instruction for ending learning.

Figure 5:
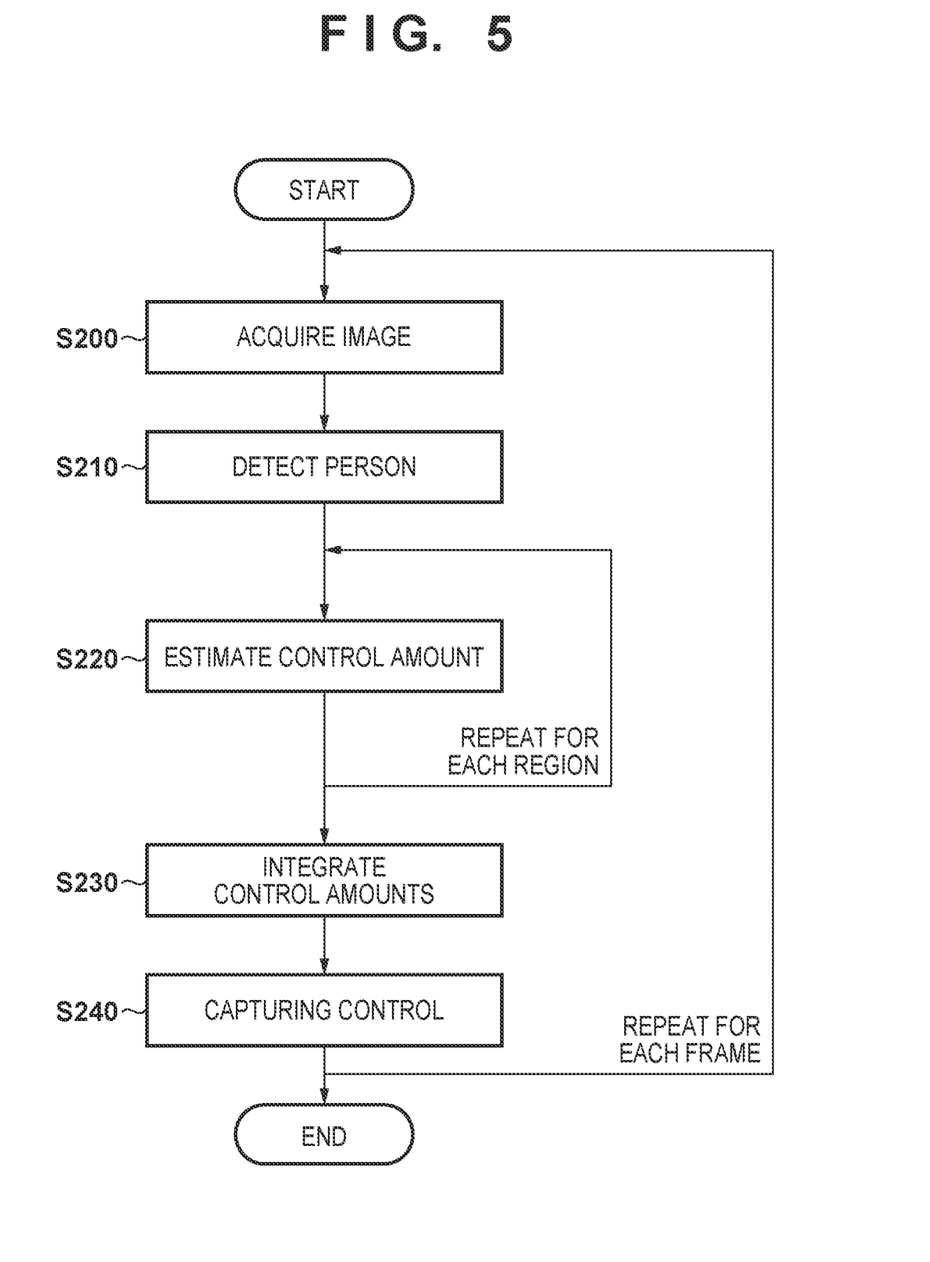
FIG. 5 is a flowchart of automatic control processing.

Next, regarding automatic control processing for controlling panning, tilting, zooming, or the like of the camera 200 that the information processing apparatus 100 performs by using the estimation parameter after completing the foregoing learning, explanation is given using FIG. 5 which illustrates a flowchart of this processing.

The processing in each step of step S200 through step S220 is the same as step S100 through step S120 described above respectively, except for the following points. The coupling coefficient of the fully-connected neural network of the aforementioned sixth layer and seventh layer which operates in step S220 is the estimation parameter updated by the foregoing learning. When the processing of step S220 completes for each person region in the captured image acquired in step S200, the processing proceeds to step S230.

In step S230, the integration unit 144 of the control amount estimation unit 140 integrates the control amounts that the estimation unit 143 outputted for the person regions to thereby decide a control amount for the camera 200. For a method of integrating, there are various integration methods. For example, the integration unit 144 outputs, as an integration result, a control amount having the highest corresponding interest level out of the control amounts for the person regions that are outputted from the estimation unit 143. In addition, the integration unit 144 outputs, as an integration result, a result of performing a weighted average by weighting the control amounts estimated from a plurality of person regions with the corresponding interest levels.

In step S240, the capturing control unit 300 generates a control signal that represents the control amount outputted from the integration unit 144 in step S230 as an integration result, and outputs the generated control signal to the camera 200. By this, the camera 200 operates in accordance with the control signal outputted from the capturing control unit 300.

Because the processing in accordance with the flowchart of FIG. 5 is processing for a captured image of one frame, the processing in accordance with the flowchart of FIG. 5 is actually performed for each captured image inputted from the camera 200. Note that a condition for ending the processing in accordance with the flowchart of FIG. 5 is not limited to a specific condition for ending. For example, configuration may be taken so that the processing in accordance with the flowchart of FIG. 5 is caused to end when a user has operated the operation unit 400 to input an instruction for ending the processing in accordance with the flowchart of FIG. 5. Note that both of the control amount and the interest level are learned (updated) in the above explanation, but an embodiment in which only one of these is learned (updated) may be taken.

Second Embodiment

Each functional unit that configure the information processing apparatus 100 illustrated in FIG. 1 may be configured by hardware, and some functional units may be configured by software (a computer program). In the latter case, the capturing control unit 300, the operation information acquisition unit 120, the image acquisition unit 110, the human detection unit 130, the control amount estimation unit 140, and the learning unit 150 may be configured by software. In such a case, a computer apparatus having a processor that can execute this software can be applied to the information processing apparatus 100.

Figure 6:
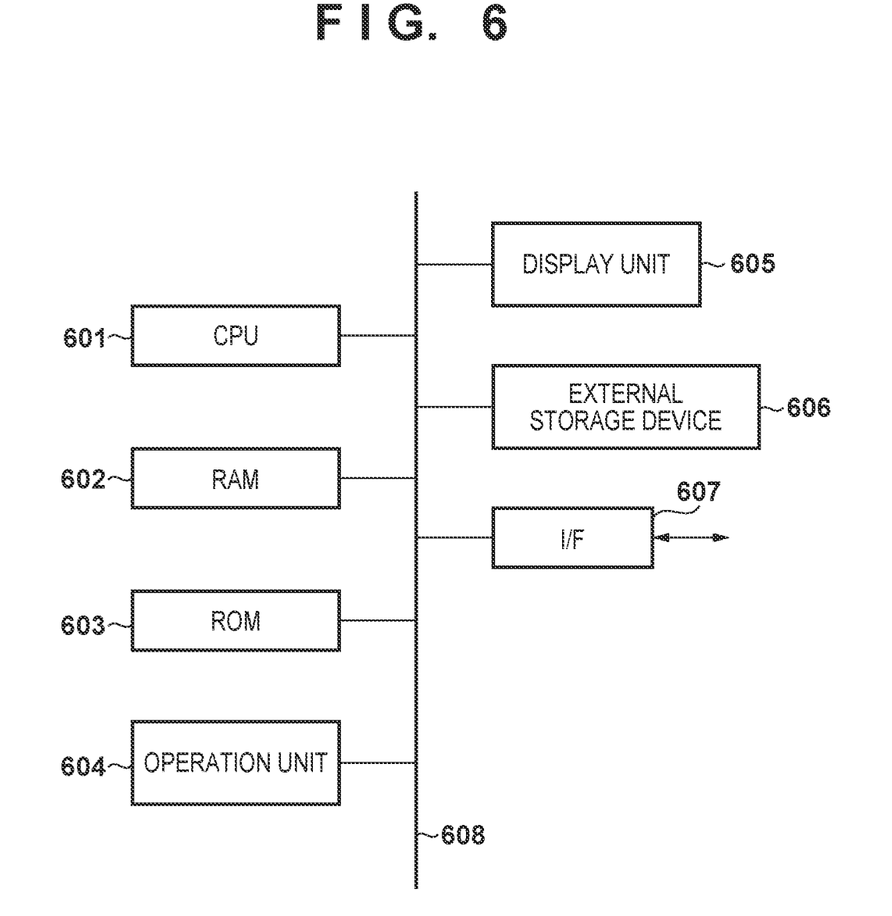
FIG. 6 is a block diagram for illustrating an example of a hardware configuration of a computer apparatus.

The block diagram of FIG. 6 is used to give an explanation regarding an example of a hardware configuration of a computer apparatus that can be applied to the information processing apparatus 100. Note that an example of a hardware configuration of a computer apparatus that can be applied to the information processing apparatus 100 is not limited to the configuration illustrated in FIG. 6. In addition, the information processing apparatus 100 may be configured by one computer apparatus, and may be configured by a plurality of computer apparatuses.

A CPU 601 executes processing by using data and a computer program stored in a RAM 602 or a ROM 603. By this, the CPU 601 performs operation control of the computer apparatus as a whole, and executes or controls each process described above as something that the information processing apparatus 100 performs.

The RAM 602 has an area for storing data received from an external unit (for example, the camera 200) via an I/F (interface) 607, and data or a computer program loaded from the ROM 603 or an external storage device 606. Furthermore, the RAM 602 also has a work area that is used when the CPU 601 executes various processing. In this way, the RAM 602 can appropriately provide various areas. The ROM 603 stores, for example, a computer program or setting data that does not need to be rewritten.

An operation unit 604 is a user interface that can be applied to the operation unit 400 described above, and a user can input various instructions to the CPU 601 by operating it. A display unit 605 is a display apparatus that can be applied to the aforementioned display unit 500, and can display results of processing by the CPU 601 using image, text, or the like. Note that a touch panel screen may be configured by integrating the operation unit 604 and the display unit 605.

The external storage device 606 is a large capacity information storage device as typified by a hard disk drive device. The storage unit 160 described above can be implemented by the RAM 602 or the external storage device 606. An OS (operating system), computer programs and data for causing the CPU 601 to execute or control each process described above as something that the information processing apparatus 100 performs is saved in the external storage device 606. Computer programs saved in the external storage device 606 includes the software described above. In addition, the data saved in the external storage device 606 includes data explained as known information in the foregoing explanation. Data and a computer program saved in the external storage device 606 are appropriately loaded into the RAM 602 in accordance with control by the CPU 601, and become a target of processing by the CPU 601.

The I/F 607 functions as an interface for connecting the information processing apparatus 100 with an external device, and functions as an interface for connecting the camera 200 described above with the information processing apparatus 100, for example. All of the CPU 601, the RAM 602, the ROM 603, the operation unit 604, the display unit 605, the external storage device 606, and the I/F 607 are connected to a bus 608.

In this way, because, in the above embodiments, learning is performed so as to reduce a difference between a user operation and a control amount estimated from a detection result, learning of capturing control that takes into account a user's intention is possible. Furthermore, an interest level is evaluated in conjunction with evaluating loss due to differences in control amounts, and it is possible to avoid tracking an unintended person and incorrect capturing control for the cases of where a person does not appear.

Note that, in the foregoing embodiments, the control amount estimation unit 140 includes a neural network, but the human detection unit 130 may similarly include a neural network. In such a case, it is possible to share the feature extraction unit 142 described above with the human detection unit 130. In addition, it is possible to configure the control amount estimation unit 140 with an estimation unit in accordance with different machine learning, such as support vector regression.

In addition, in the foregoing embodiments, the control amount estimation unit 140 estimates the control amount from an image and a result by the human detection unit 130, but it is possible to estimate a control amount using only the result by the human detection unit 130.

In addition, in the foregoing embodiments, the control amount estimation unit 140 estimates the control amount from an image and a result by the human detection unit 130 for a still image, but the control amount may be estimated from a spatio-temporal image that combines results from the human detection unit 130 for a plurality of frames of images in chronological order. By this, it is possible to learn what kind of movement by a person a user took an interest in when the user operated the camera.

In addition, in the foregoing embodiments, the control amount estimation unit 140 estimates a control amount by using a likelihood and image coordinates of the four corners of a person region outputted by the human detection unit 130, but it is sufficient if information used in this estimation is information that represents a position of a person in an image. For example, this information may be something such as a likelihood map in which likelihoods representing existence probabilities of persons are associated with two-dimensional coordinate positions.

In addition, in the foregoing embodiments, the learning unit 150 separately acquires, as learning data, a plurality of estimation results from an image that are estimated by the control amount estimation unit 140, but these may be used as learning data after being integrated as one estimation result by the integration unit 144 of the control amount estimation unit 140. Alternatively, estimation may be performed by using a recursive neural network such as an RNN (Recurrent Neural Network) or an LSTM (Long Short-Term Memory) to integrate a plurality of estimation results. In such a case, output by the learning unit 150 is acquired as learning data.

In addition, in the foregoing embodiments, explanation was given by taking a person (person region) as a detection target as an example, but a detection target is not limited to a person, and an object other than a person may be set as a detection target. In addition, the number of cameras is set as one in FIG. 1, but limitation is not made to this, and a plurality of cameras may be set as control targets. In addition, in the foregoing embodiments, a control amount includes three things—panning, tilting, and zooming of the camera 200, but limitation is not made to this, and the control amount may include at least one of panning, tilting, and zooming. Note that some or all of the various variations described above may be appropriately combined.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like. While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-004616, filed Jan. 13, 2017, which is hereby incorporated by reference herein in its entirety.

What is claimed is:
1. An information processing apparatus, comprising:
one or more processors; and a memory coupled to the one or more processors, the memory having stored thereon instructions which, when executed by the one or more processors, cause the apparatus to:

obtain an image feature amount in a region of an object detected from a captured image by an image capturing device;

estimate a first control amount of the image capturing device based on the image feature amount in the region of the object, image coordinates of the region, and a likelihood of the region;

acquire a second control amount of the image capturing device instructed in accordance with a user operation; and update a parameter used for the estimation of the first control amount, based on a difference between the first control amount and the second control amount.

2. The information processing apparatus according to claim 1, wherein the parameter is a coupling coefficient between neurons in a fully-connected neural network.

3. The information processing apparatus according to claim 2, wherein the parameter is updated by using a stochastic gradient descent.

4. The information processing apparatus according to claim 1, the instructions, when executed by the one or more processors, causing the apparatus to control the image capturing device in accordance with the first control amount that is estimated by using the updated parameter.

5. The information processing apparatus according to claim 4, wherein a first value indicating a level of interest with respect to the object based on the region of the object is estimated, a second value indicating a level of interest with respect to the region by a user in the captured image is acquired, and the parameter required for the estimation is updated based on the first value and the second value.

6. The information processing apparatus according to claim 5, wherein the instructions, when executed by the one or more processors, causing the apparatus to decide, out of a plurality of control amounts that are estimated by using the parameter updated, a control amount being estimated based on the region for which the first value is largest as the first control amount.

7. The information processing apparatus according to claim 5, wherein the instructions, when executed by the one or more processors, causing the apparatus to decide a result of performing, on a plurality of control amounts of the image capturing device that are estimated by using the updated parameter, a weighted average taking the first values corresponding to the plurality of control amounts as weights as the first control amount.

8. The information processing apparatus according to claim 1, wherein the first control amount includes at least one of panning, tilting and zooming of the image capturing device.

9. A system comprising an image capturing device and an information processing apparatus operable to control the image capturing device, wherein the information processing apparatus comprises:

one or more processors; and a memory coupled to the one or more processors, the memory having stored thereon instructions which, when executed by the one or more processors, cause the apparatus to:

obtain an image feature amount in a region of an object detected from a captured image by an image capturing device;

estimate a first control amount of the image capturing device based on the image feature amount in the region of the object, image coordinates of the region, and a likelihood of the region;

acquire a second control amount of the image capturing device instructed in accordance with a user operation; and update a parameter used for the estimation of the first control amount, based on a difference between the first control amount and the second control amount.

10. An information processing method, comprising:

obtaining an image feature amount in a region of an object detected from a captured image by the image capturing device;

estimating a first control amount of an image capturing device based on the image feature amount in the region of the object, image coordinates of the region, and a likelihood of the region;

acquiring a second control amount of the image capturing device instructed in accordance with a user operation; and updating a parameter used for the estimating, based on a difference between the first control amount and the second control amount.

11. A non-transitory computer-readable storage medium storing a computer program for causing a computer to obtain an image feature amount in a region of an object detected from a captured image by an image capturing device;

estimate a first control amount of the image capturing device based on the image feature amount in the region of the object, image coordinates of the region, and a likelihood of the region;

acquire a second control amount of the image capturing device instructed in accordance with a user operation; and update a parameter used for the estimation of the first control amount, based on a difference between the first control amount and the second control amount.

* * * * *